2,983,653
Patented May 9, 1961

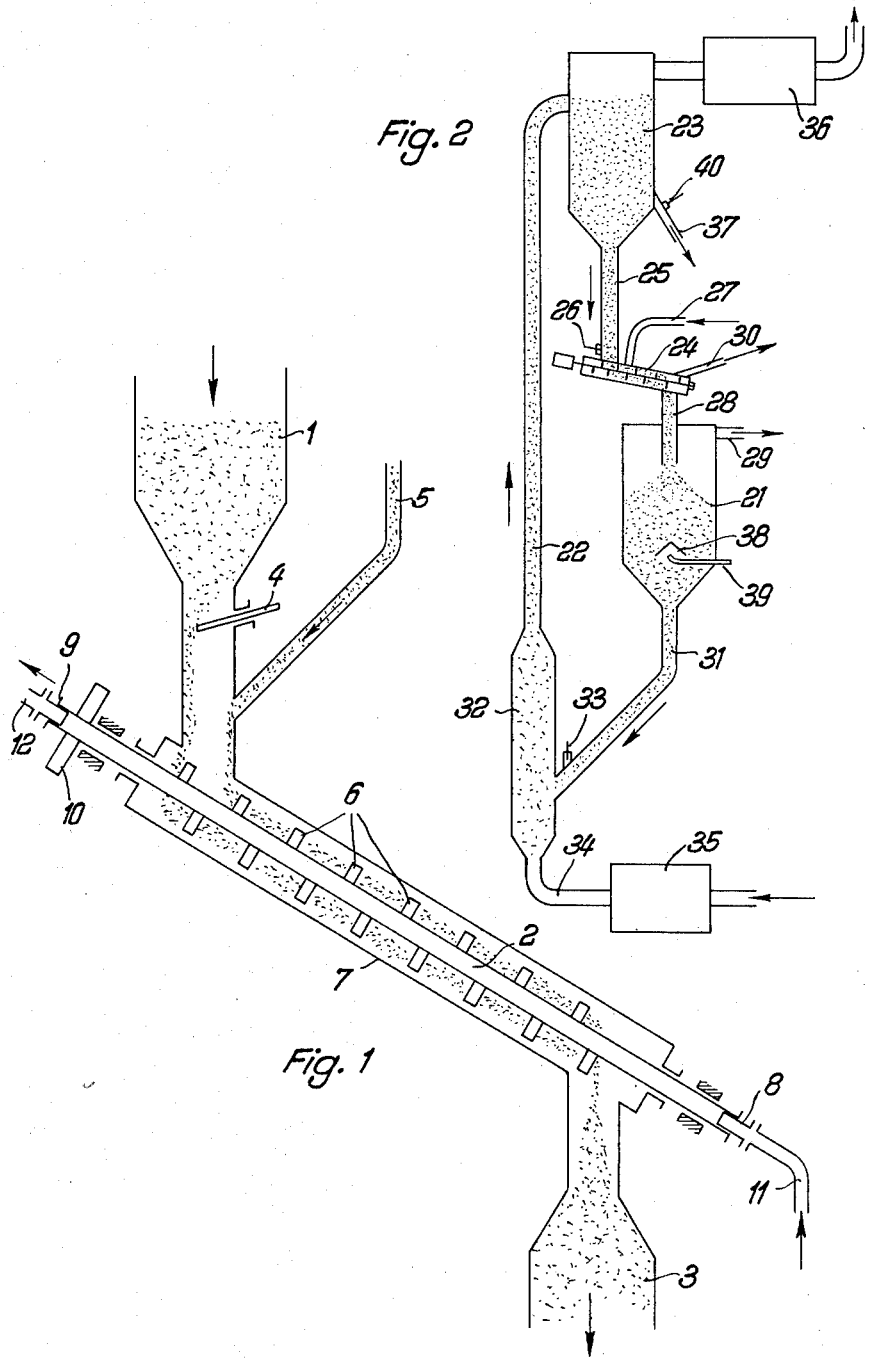

2,983,653
APPARATUS FOR DEGASIFYING FINELY DIVIDED FUELS

Friedrich Danulat, deceased, late of Frankfurt am Main, Germany, by Hedwig Gertrud Danulat (widow and guardian of Dieter Danulat, minor heir), Ilse Penndorf, née Danulat, and Hans Friedrich Danulat, heirs, Frankfurt am Main, and Paul Schmalfeld, Bad-Homburg-Gonzenhaim, Germany, assignors to Metallgesellschaft Aktiengesellschaft, Frankfurt am Main, Germany Filed Dec. 1, 1954, Ser. No. 472,662

Claims priority, application Germany Dec. 4, 1953

1 Claim. (Cl. 202—118)

This invention relates to a method of degasifying or degasifying and gasifying pulverulent or finely granular fuels.

Fuels in the form of dust or fine particles have been degasified, or degasified and gasified in accordance with known methods by introducing the fuel into the reaction chamber together with a solid heat carrier. The heat carrier supplied the heat which was required for the degasification or gasification taking place while the fuel and heat carrier were in movement. The agglomeration of the fuel into coarse grains or lumps and solid depositions of fuel on the heat carrier could frequently occur in this process, particularly when the fuel had caking properties. These phenomena led to disturbances of the degasification or gasification operations and to irregularities in the movement of the mixture of heat carriers and fuel through the reaction chamber, which were caused particularly by the formation of depositions and bridges and which could render regular operation impossible.

The present invention aims at obviating the foregoing disadvantages by mixing the fuels in pulverulent or finely granular form with heated heat carriers, in pulverulent or finely granular form, and bringing them into intimate contact with one another, in a worm which consists of a preferably water-cooled shaft and stirring arms or paddles which are secured to said shaft, while the latter with the paddles or the like works in an advantageously tubular housing. By virtue of the intimate mixing of fuel and heat carriers, rapid transfer of heat from the heat carriers to the fuel is effected, so that the latter is rapidly heated above the lower degasification stage, at which it tends to melt or cake and which generally lies between about 300 and 550° C. It has unexpectedly been found that the relative movement caused by the worm between the fuel, heat carriers, and the worm, does not permit the occurrence of any increase, or of any detrimental increase, of the grain size of the fuel. The formation of thicker coatings or depositions on the surface of the heated heat carriers or on the parts and walls of the mixing worm is also eliminated, and there is no solidification of the fuel, which can now be further degasified, and if desired gasified, without disturbances and without danger.

The action of the hereindescribed process can be increased in some cases, for example in the case of the treatment of caking fuels, by filling the worm housing incompletely with material, for example filling it only to the extent of one half or one third. Great dependability of operation can be achieved even in the case of the most difficult fuels by specially shaping the mixing mechanism. This comprises the use of two mixing worms which rotate in the same direction and which mesh with one another in such manner that the paddles of each mixing worm clean the free space between the paddles of the other mixing worm. Both worm shafts can be rotated at the same speed or in an integral speed ratio, for example 1:2 or 1:3. The paddles are advantageously so constructed that they fill the space not covered by the paddles of the coacting worm.

In many cases it is advantageous to introduce the mixture of fuel and heat carriers from the mixing mechanism into a chamber in which the further degasification of the fuel takes place. The arrangement is then advantageously such that the mixture issuing from the mixing mechanism moves in free fall through the upper part of said degasification chamber. For example, the mixing device is so operated that the mixing chamber followed by the degasification chamber is not completely filled with material and that the material can flow out of the mixing device without obstruction. The degasification of the fuel is thereby substantially accelerated, and at the same time the effect is achieved that even when the fuel has substantial caking properties, it does not tend to form lumps or deposits in the degasification chamber. In addition, the path of the fuel and of the heat carriers through the mixing apparatus can thereby be made substantially shorter. Further advantages consist in that the discharge of gases from the upper part of the degasification chamber can be made simpler and that the falling space in the upper part of the degasification chamber can at the same time effect an equalisation between irregularities in the passage of material through the mixing worm and the degasification chamber.

In carrying out the invention, use is made of a heat carrier in the form of fine grains or dust, which, given suitable material to be degasified, advantageously consists of the coke produced by the degasification or the residue produced in the process. The mixture of circulating heat carriers and newly formed coke or residue, which is likewise in the form of fine grains or dust, after being discharged from the degasification chamber, is delivered upwards pneumatically by means of air, if desired with the addition of other gases, for example steam, returned combustion gases from the conveyor air, carbon dioxide, nitrogen, or the like, for example into a separator, storage chamber, or the like, and at the same time is heated, preferably by reaction of the conveyor air with the carbon contained in the residue. In the separator or the like the heat carriers are separated from the gases which were used to heat the heat carriers, and the latter are returned to the mixing mechanism. Depending on the temperature conditions which are maintained during the heating of the heat carriers, and the reaction speeds, the reaction which takes place during heating leads to a different ratio of carbon dioxides to carbon monoxide in the reaction gases of the conveyor air.

The separator or the like advantageously consists of a coarse separator, for example in the form of a stabilising chamber, in which the gas has a low speed, or of a simple cyclone, so that the finest particles of solid substances contained in the gas are separated only to a limited extent in the coarse separation stage and the major part thereof is discharged from the heat carrier cycle together with the reaction gases.

If the form or the nature of the coke produced or its ashes is unsuitable, for example if it is too fine, other cokes, fuel ashes, fireclay, alumina, silica (quartz or other modifications), silicates, magnesium oxide, or like oxidic compounds, or mixtures thereof, can be used. The heat carriers should preferably not tend to wear away readily, for example by splintering, erosion, detrimental chemical changes, or the like, in order that the amount required and the production of fine dust should not increase excessively. It is possible, if desired, to use extraneous substances of the type hereinbefore specified together with the residue of the degasification material. The grain size of the heat carriers advantageously lies between about 0.1 and 4.0 mm. When the grain size is finer than 0.1 mm., the separation of the heat carriers from the conveyor gases is generally more difficult and requires fine separators, which work at high speed and, in consequence of the resulting loss of pressure, with a high consumption of power. On the other hand, the suspension speed increases with the grain diameter, so that the speeds of the pneumatic conveying and hence the consumption of power and the wear increase with the grain diameter, and in the case of a substantially greater diameter than 4.0 mm., the conveying cost for the process can increase uneconomically.

The fuel used preferably also has a grain size between about 0.1 and 4.0 mm., for example 0.5–2 mm. It may however also be rather coarser, since through the degasification operation there is a shrinkage or reduction of the specific gravity of the grain. The grain size of the fuel which is advantageous in a particular case is readily obtained by sifting or simple comminution when the grain size supplied is too coarse, and requires no increased expense for grinding, as is frequently the case with normal dust firing or dust gasification, on account of the necessity of very finely ground dust.

The circulation of the heat carriers is advantageously regulated by providing at the inlet of the heated heat carriers into the mixing apparatus, a distributing and regulating device for the heat carriers, for example a throttle slide valve or the like, which permits a constant and uniform amount of heat carriers to pass through. At the point of admission of the heat carriers into the pneumatic conveyor, a distribution and regulating device for the heat carriers is also disposed in the same or other manner. These two regulating devices permit the adjustment of the amount of heat carriers circulating and the adjustment of the level of heat carriers in the degasification chamber and in the collecting bunker before the admission of the heat carriers into the mixing apparatus.

As the heat carriers pass through the mixing mechanism and the degasification chamber, they pick up the degasification residue. After the pneumatic conveying operation the portion of finest grain is partly separated from the heat carriers and removed from the heat carrier circuit. If the levels of heat carriers in the degasification chamber and in the collecting chamber increase, the excess of heat carriers corresponding to such increase is continuously or periodically discharged. If the fraction of outgoing fine dust and burnt carbon in the pneumatic conveying stage is greater than the admission of degasification residue, heat carriers are advantageously additionally introduced into the circuit, for example together with the material to be degasified, in order to obtain dependable maintenance of the levels in the degasification chamber and in the collection bunker. The degasification chamber is advantageously separated by columns of material from the pneumatic conveying stage and the separating chamber for the heated heat carriers.

The closed column of material with the throttle device above the mixing device and extending as far as the collecting bunker on the one hand and from the throttle device at the point of admission into the pneumatic conveying stage as far as the degasification chamber on the other hand, prevents the flow of gas between both the gas chamber of the degasification chamber and the conveying device and/or separating chamber for the heat carriers. The pressure in the degasification chamber is advantageously maintained in constant dependence on the pressure in the pneumatic conveyor or in the chamber for the separation of the circulating heat carriers from the reaction gases of the conveyor air. For example, the pressure in the degasification chamber and the pressure in the separation chamber are adjusted approximately to the same level, so that practically no flow of gas can occur between said two chambers. Without taking special steps to counteract this, the pressure in the lower part of the conveyor device is then higher than that in the degasification chamber, so that a certain, relatively small amount of air or combustion or gasification products flows through the column of material into the degasification chamber. The degasification gas is thereby enriched with a little nitrogen. If desired, this may be prevented for example by introducing a certain, relatively small amount of degasification gas or other suitable gas, such as carbon dioxide, steam or the like, which would correspond approximately to the amount of air otherwise flowing through, into the bottom part of the column of material between the conveyor device and the degasification chamber. This gas then flows upward through the column of material back into the degasification chamber and forms a reliable barrier between the conveyor device and the degasification chamber.

If the heat carriers are heated by combustion of carbon contained therein, for example with the air which is used for the conveyance of the heat carriers in a closed cycle, the amount of air required for such conveyance determines the heat which is supplied to the heat carriers by the reaction of the conveyor air with the carbon contained in the heat carriers. If the amount of air which is required for production of the necessary heat is now not sufficient to effect the pneumatic conveyance of the heat carriers, other gases, which do not participate in the reaction, such as for example combustion gases or else nitrogen, can advantageously be added to the air.

Thus, for example, under partial load operating conditions of the degasification plant, the heat required for degasification and hence also the amount of air needed for pneumatic conveyance and heating of the heat carriers, are smaller than when the plant is under full load. If this amount of air falls below a certain value, the pneumatic conveyance of the fine grained heat carrier is no longer ensured, since the speed of the gases in the conveyor path is too low. At the same time, under partial load conditions, the amount of coke or degasification residue produced is smaller. In order to take into account these phenomena occurring under partial load conditions, when the output of the degasification plant is reduced, steam or inert gases, for example the reaction gases, i.e. the gases which have been used for the conveyance and heating of the heat carriers, after the cooling which may be necessary or desirable for their passage through the apparatus for conveying purposes, are introduced, in addition to the air for combustion, into the heating and conveying plant for the heat carriers. Waste gases from the apparatus, for example steam boiler furnace or the like, in which the coke or degasification residue is used, are particularly advantageously added in the necessary amount to the air for combustion, before or after passing through a blower delivering said said waste gases, in order to ensure the pneumatic conveyance, and to prevent the degasification plant from overheating. The difficulties which arise from a reduced production of the degasification residue are furthermore obviated by a special construction of the plant for the combustion of the coke or degasification residue.

If the heated heat carriers which have been separated from the heating and conveying gases are not to contain substantial amounts of carbon after passing out of the separating and if desired storing device, steam and/or carbon dioxide can be added to the conveying air. Excess carbon, not consumed for the heating, in the degasification residue can thereby be converted into carbon monoxide and hydrogen. This is of particular advantage if the conveying gases are to be further used after leaving the pneumatic conveyor and separation of the recycled heat carriers, for example if it is desired to feed them to the combustion devices of a gas turbine.

The combustion and/or gasification of the carbon contained in the degasification residue in the pneumatic conveying and heating path can if desired be promoted by making the conveying speed as low as possible over the entire length or over a part of the path. In the first part, the heating path can for example be constructed as a fluidised bed, of the mixture of heat carriers and degasification residue, in which the conversion of the conveying air with combustible constituents of the mixture to form poor gas and the heating of the heat carriers take place.

In order to obtain uniform and intimate mixing with the heated heat carriers in the mixing device, the heat carriers and also the material to be degasified are fed continuously and in a uniform current into the mixing apparatus. The ratio of the weight introduced of the material in dust form to be treated to the weight of the heat carriers can amount to about 1:1 to 1:100. In most cases, 5 to 50 times, for example 15 to 25 times, the amount by weight of heat carriers, referred to the freshly introduced fuel, is used, so that the individual fuel grain is thoroughly surrounded by the heat carriers and rapidly heated.

Even when using very large amounts of heat carriers, per unit of substance to be treated, the heating of the carriers is not uneconomical, because on the one hand the heat carriers are cooled on passing through the degasification plant only with a low temperature drop and for their reheating it is necessary to apply only the heat which is required to heat the heat carriers in accordance with said temperature drop from the outlet temperature on passing out of the degasification plant to the inlet temperature, this amount of heat corresponding substantially to that which the heat carriers have given up in the degasification plant to the material to be treated, and also because in the hereindescribed process a particularly good utilisation of the outgoing heat and of the heat of combustion of the substances leaving the process is possible. Since in fact, in accordance with the invention, the material to be degasified is converted into concentrated degasification gas, poor gas, and dust in highly heated form, the hereindescribed process can advantageously be combined with dust furnaces, for example for steam boilers, in which the heat of the hot outgoing gases and of excess combustible solid substances, for example coke, is utilised. The process can however also be very successfully used for example in combination with roasting and sintering or other metallurgical processes in which the hot outgoing gases and coke are then used.

With the hot gases which are discharged from the conveying and heating path for the heat carriers, coke or degasification residue in dust form can be discharged with a grain size such as is convenient or permissible for the following utilisation plant, for example a steam boiler furnace.

The separator for separating the coke from the gases from the pneumatic conveyance and heating path for the heat carriers is for example advantageously so proportioned in its separating action that it permits the separation of practically precisely all the grains above the fineness of grain required by the furnace.

If it is not possible to use coarser excess coke than that left in the reaction gases after the separator, the grain fineness of the fuel to be degasified is advantageously so adjusted that the heat carrier level in the separator always remains practically the same. Since a certain comminution of grain occurs through the degasification operation, the extent of which depends on the individual nature of the fuel to be degasified, and since the circulating heat carrier also undergoes a comminution of grain, the grain size of the fuel to be degasified may be coarser by a certain amount than the grain fineness of the coke required by the furnace.

In the event of the fine dust being a disturbing factor in the combustion of the reaction gases in the following steam boiler or other apparatus, for example if it tends to form depositions or gives rise to considerable wear, the gases can also be freed from dust to a substantial extent by means of fine separators, for example in highly effective multiclones, or the like. The removal of fine dust enables higher gas speeds to be used in the steam boiler or also, for example, in a gas turbine. The fine dust separated can then be supplied to the heat carrier circuit or be used for other purposes, for example in a separate steam boiler, a sintering band, or the like, for example in order to utilise the carbon which may be contained therein.

In order to reduce the wear on the combustion apparatus and to adapt the output of the degasification plant to a fluctuating output of the combustion device for the utilisation of the poor gas produced in the process and of the excess coke or the like, particularly in the operation of a steam boiler, the excess fraction of coke or degasification residue can be taken off separately from the chamber for the separation of the heat carriers from the hot conveying gases, and supplied to the boiler furnace or the like separately from the hot gases, while the hot gases are introduced separately at another point into the same furnace. The separator and the furnace are then so disposed that the coke or degasification residue moves through its own weight without special conveying devices and passes into the furnace in the hot state. This results in the additional advantage that the furnace can be operated with a readily ignitable fuel with the maximum efficiency and can be of particularly simple construction. The furnace is with particular advantage disposed in the uppermost part of a steam boiler and the furnace gases are first passed downwards for example in a first flue and then for example upwards in a second flue followed by the dust separator and chimney.

The excess coke or degasification residue can be withdrawn constantly in a uniform amount from the bunker chamber of the separator, in which case a small bunker chamber is sufficient. The coke or degasification residue may also however be withdrawn in a varying amount and also periodically. It may for example be used in maximum amount for special peak requirements. It is then also possible to charge the degasification plant with varying amounts of coal to be degasified in order to comply with the requirements of the fluctuating need for coke or degasification residue for firing. The degasification plant may however also have a constant through-flow and sufficient amounts of coke or degasification residue for peak requirements may be stored in the bunker chamber of the separator. The bunker chamber is adapted in capacity to the varying requirements of amounts of coke or the like to be supplied.

It has been found to be another advantage of the invention that the excess coke or degasification residue can be utilised together with other fuels and if desired together with the fraction in dust form separated from the heating gases. Thus it acts as a good addition for example in the hot briquetting of mineral coal and increases the briquetting properties of the latter. It is then possible to obtain maximum effect with relatively small amounts of coke or degasification residue. It can also be used with similarly good results for briquetting ores if desired together with other substances promoting briquetting, particularly fuels.

Further advantages of the invention in respect of heat economy consist in the heat available in the coke or degasification residue, when it is used hot at approximately the temperature at which it is obtained from the degasification process or from the heating of the heat carriers. The coal to be treated can then be after-dried and it can be preheated to the optimum-temperature for its treatment for example for briquetting. In hot briquetting, the coal is pressed in the plastic state, i.e. for example in the temperature range between about 350 and 450° C. It is now difficult to transfer to the coal the necessary heat precisely in the plastic condition. This is effected for example by first preheating the coal which is to undergo hot briquetting, by means of flue gases or steam, to temperatures of, for example, about 200–300° C. i.e. below the temperature at which it becomes plastic and begins to detar and then, by admixing the hot coke at for example 1,000° C., heating it to a temperature of for example 300° C. or higher, and pressing it at that temperature. The admixture of the hot coke or degasification residue can for example be carried out in a mixing mechanism, which can be of similar construction to the mixing mechanism used according to the invention for mixing the fuel and heat carriers.

The degasification can be carried out at will, at high, medium, or else at low temperatures. The temperature is mainly dependent on the desired nature of the degasification products. When working at a high degasification temperature, of, for example, 1,000° C., the tar released from the degasification material is largely decomposed and converted into gas, and the volatile constituents of the degasification material are largely driven off. Only a small amount of coke then remains as residue. If, on the other hand, degasification is carried out at a low temperature of for example 600° C., the tar freed from the degasification material is largely retained and is entrained by the degasification gas from the degasification chamber. The amount of the degasification gas is smaller than in the case of high temperature degasification, but in general the gas has a higher calorific value. The amount of residue is also greater, since a part of the volatile constituents remains in the residue, for example coke.

The gases produced in the mixing device can be discharged separately from the gases of the second degasification stage. In addition, two mixing devices may be disposed, one behind the other, while a part of the heated heat carriers is fed to the first mixing device, while another part is introduced only into the second mixing device. The temperature in the first mixing device is lower than in the second, so that for example the degasification of the fuel can take place in the first mixing device at lower temperatures and the complete degasification of the fuel be effected only in the second mixing device. The gases from the two degasification stages can be discharged separately and utilised separately. This mode of operation for example permits production to a large extent of the tar in the first mixing device without heavy cracking or decomposition of the tar. The two mixing devices are advantageously separated from one another by a column of material from the mixture of heat carriers and degasification residue, which provides a mutual barrier between the two mixing devices or degasification stages.

If it is desired to avoid the consumption of coke for the purpose of heating the heat carriers, heating gases can advantageously be added to the conveying air, in order to supply the necessary amount of heat for heating the heat carriers by combustion of the heating gases. A furnace may also precede the conveyor and heating path in which furnace for example coal dust or else coal in granular form or liquid or gaseous fuels or the like can be burned with the conveyor air. The resulting combustion gases at high temperature are introduced into the conveyor and heating path, in order to effect the heating and conveyance of the heat carriers. When operated with solid fuels the furnace preceding the conveying and heating path can for example be operated with a liquid tapped slag.

In certain cases it may be desirable to admix water gas with the degasification gas, in order for example to increase the amount of gas or else in order to reduce the calorific value of the gas, in order that the mixing gas may for example comply with the standards for town gas. The production of water gas can be coupled with the degasification, for example by introducing into the bottom part of the degasification chamber steam which flows through the mixture of fuel and circulating heat carriers at the high temperature prevailing in the degasification chamber. The steam reacts with the carbon in the fuel and produces predominantly carbon monoxide and hydrogen together with carbon dioxide in accordance with the conditions of equilibrium.

The adjustment of the calorific value of the gas can also be effected by other means, for example, by injecting air, oxygen, or air enriched with oxygen, or the like, together with or instead of the steam. The injection of steam or the like and the production of water gas increase the amount of gas flowing through the filling of the degasifying chamber, so that the gas can entrain dust. It is therefore advantageous in many cases to produce the water gas in a separate apparatus, if desired in a chamber following the degasification chamber, and to mix the water gas with the degasification gas after purification of the former.

If the completest possible recovery of the tar contained in the fuel is desired, particularly by the application of low desgasification temperatures, the introduction of small amounts of steam or else of gas into the degasification chamber can be of advantage, in order through the consequent flushing action to obtain more rapid discharge of the tar vapours and still further to prevent the decomposition of tar. Advantages in respect of heat economy can also be obtained in many cases by heating the air for the pneumatic conveyance of the circulating heat carriers, and/or the freshly introduced fuel, before or on entering the pneumatic conveyor. For heating the air and/or fuel, use can advantageously be made of the heat of the desgasification gas passing out in the hot state and/or reaction gases after separation of the circulating heat carriers, whereby the fuel can be pre-dried and if desired its caking properties can also be eliminated by thermal pretreatment.

If it is desired to prevent combustible gases of high calorific value from flowing on the one side of the heat exchange surfaces in the exchangers and air at superatmospheric pressure from flowing on the other side thereof, the sensible heat of the degasification gas can be utilised for the pre-drying and if desired for the heating of the fuel to be worked up and/or for other purposes in connection with the utilisation of the hot gas and of the excess coke or degasification residue, in particular for example the preheating of feed water or the direct production of steam, for which purposes the exchange of heat is not made to oxygen-containing media. For the purpose of preheating the air for combustion required in the degasification plant, instead of using the degasification gas, use is then made for example of a part or the while of the outgoing gases of the furnace of the steam boiler plant or the like, in which the heat of the coke or degasification residue produced in the process and/or of the outgoing gases from the heating of the heat carriers is utilised.

The fuel is advantageously degasified in a sufficiently pre-dried and on occasion pre-heated state, in order to improve the output and efficiency of the degasification plant. For this pre-drying and preheating of the fuel use can also be made of the sensible heat of the degasification gas, or else of the sensible heat of the reaction gases issuing from the pneumatic conveying and heating path, or a part or the whole of the outgoing gases of the furnace of the steam boiler or the like, in which the heat of the coke or of the degasification residue is utilised.

The process is advantageously carried out in an apparatus in which the degasification chamber, the mixing apparatus, and the chamber for the separation of the heated heat carriers from the conveying gases are situated one above the other, so that the heated heat carriers can move downwards through their own weight through the three chambers. The mixing devices and the separating chamber are connected together by a, preferably narrow, shaft for the passage of the heated heat carriers. The outlet for the heat carriers out of the degasification chamber is likewise connected by a preferably narrow shaft to the bottom of the pneumatic conveyor path. The conveyor path is advantageously disposed outside the degasification apparatus.

The invention will hereinafter be more fully explained with reference to the accompanying drawings, in which:

Figure 1 shows the principle of the process and of the apparatus of the invention. The mixing mechanism and the devices following the same being shown in vertical section.

Figure 2 is a vertical section through one embodiment of degasification plant for fuels.

Figure 3:
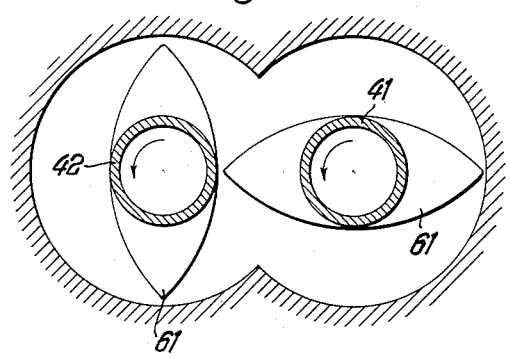
Figure 5:
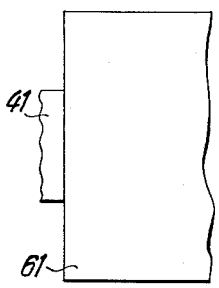
Figure 4:
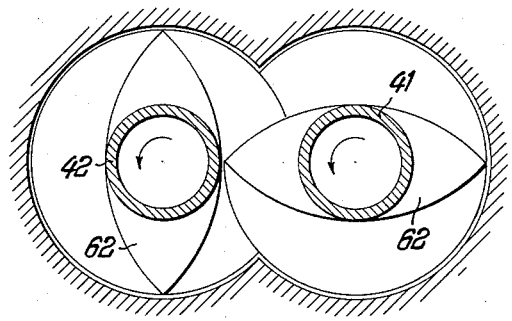
Figure 6:
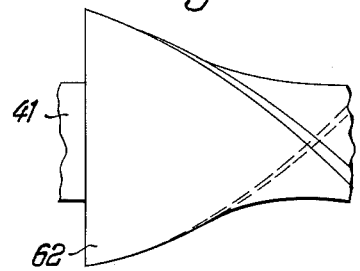
Figure 7:
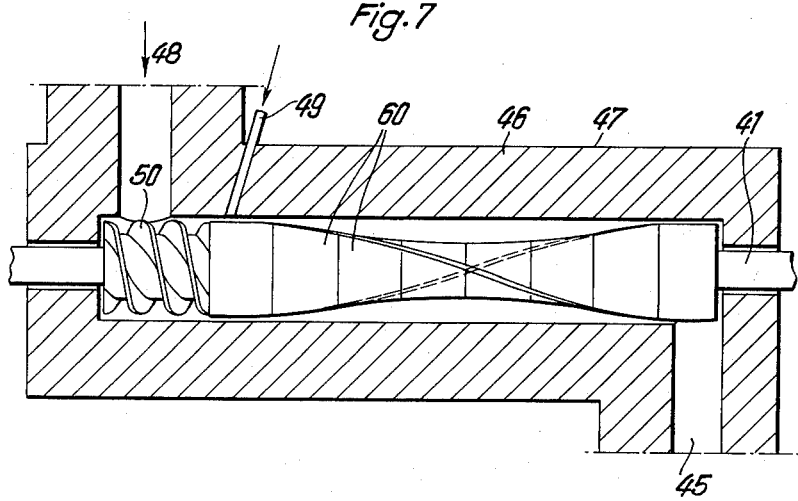

Figures 3 to 9 illustrate various embodiments of mixing mechanism in accordance with the present invention. Said figures show details of this mixing mechanism, Figures 3, 4, 8 and 9 being cross-sections through the mixing worms. Figures 3 and 4 show the shafts of the mixing worms running with a speed ratio of 1:1. Figure 5 is a side-view of the lefthand worm in Figure 3 and Figure 6 is a side-view of the lefthand worm in Figure 4. Figure 7 is a longitudinal section through a mixing apparatus of this type.

1 is a storage chamber for the heated heat carriers in the form of dust or fine granules, 2 a paddle worm and 3 the chamber in which the further working up, for example the degasification or gasification of the fuel treated in the worm 2 with the hot heat carriers, takes place. The heat carriers used advantageously have a grain size of less than 3 mm., for example under 1 mm. They can consist of coke, fuel residues, sand, fireclay, other artificial or natural ceramic, refractory, or carbon-containing materials, metals, metal oxides, mixtures of these substances, or the like. After heating they are supplied to the worm 2 from the chamber 1, which is closed towards the outside or which may also be in communication with the atmosphere, for example in amounts which are measured by means of the adjusting member 4. In addition, a batched amount of fuel is introduced into the worm through the pipe 5 with or without the aid of conveyor gas. The heat carriers and the fuel are seized in the worm by the paddles 6 and brought into intimate contact and mixed with one another. The optimum speed of rotation of the worm depends on the type of fuel, lying between about 30 and 400 r.p.m., and in many cases between 100 and 200 r.p.m.

The speed at which the mixture of heat carriers and dust flows through the worm housing can be adjusted by suitably inclining the worm and placing the paddles in an oblique position. The introduction and the conveyance of the fuel and heat carriers to and in the worm respectively are advantageously so adjusted that the worm housing is not completely filled, but for example only one half or one third or one quarter filled with the mixture of heat carriers and fuel. By virtue of this, the fuel is most favourable prepared for its subsequent gasification or degasification. In particular, it then does not vary its degree of fineness in an unfavourable manner and detrimental agglomerations are reliably avoided. This form of operation of the worm is particularly convenient when working up caking fuels. In other cases, for example with only slightly caking or non-caking fuels, a higher degree of filling, or else complete filling, of the worm housing with the mixture of heat carriers and fuel may be advantageous. For example it is then possible to work with a closed stream of heat carriers and fuel through the worm 2 and chamber 3, while for example the regulation of the throughput by means of the slide 4 is dispensed with and instead the regulation of the amount of heat carriers circulating can be effected exclusively elsewhere, for example at the outlet from the chamber 3.

The worm shaft is advantageously made hollow, while a cooling medium, for example cooling water, or else a heating medium, can be passed through the bore, said medium being for example supplied through the pipe 11 with stuffing box 8 and discharged through the pipe 12 with stuffing box 9. The worm shaft is for example driven by a pulley or gearwheel 10 in conjunction with a driving motor and gear (not shown). The worm has been illustrated as working with a slight downward inclination. It may also lie horizontal or have a greater inclination or else be disposed vertically. In some cases it may also be advantageous to arrange the worm more or less steeply in the upward direction.

Particularly dependable operation is obtained with a mixing mechanism which is equipped with two worms situated side by side in which the paddles are lenticular in cross-section (Figures 3 and 4). A mixing mechanism of this type has for example rotating worm shafts 41 and 42 which are fitted with paddles 61 and 62 respectively. Said paddles follow one another along the shaft without any gap, so that they can completely cover the housing space and thus keep the same clean. Depositions on the worms themselves are removed or prevented by the paddles rotating in the same direction on the coacting worm, while the two mutually keep one another clean to the extent shown in the figures.

The lenticular bodies are advantageously made smooth or straight and continuous (61 in Figures 3 and 5) or uniformly and continuously spiralled (62 in Figures 4 and 6). This affords the advantage that even when operating the apparatus at higher temperatures, for example at 1000° C., or in the event of fluctuations in temperature, the apparatus operates reliably and longitudinal expansions, which may occur in consequence of the high temperatures or fluctuations in temperature, need not be specially taken into account, as is for example the case when paddle worms are used which consist of individual lenticular bodies disposed at intervals from one another in the form of a spiral staircase.

When smooth and continuously spiralled lenticular bodies are used, a good mixing action and reliable forward travel of the material are surprisingly obtained. These favourable effects are not produced by friction but by the fact that one worm strips the material to be mixed from the other one, passes it around in its own worm chamber, and gives it back to the other worm. The material thus performs a movement around both worms, while in the stripping operation the space filled by the material to be mixed continuously changes its shape and the material to be mixed at the edge parts is displaced towards the interior and that at the interior parts is displaced towards the edge. The lenticular bodies mutually clean one another and also the housing, so that disturbing depositions are avoided. The use of continuously spiralled lenticular bodies avoids shock-like stresses on the shaft and hence on the gear, and provides for balanced forces and steady running of the gear. This spiralling also gives a more or less intense forward movement of the material to be mixed, depending on the pitch and the speed.

In the embodiments illustrated in Figure 7, the worm shafts 41 and 42 are built into a brick-lined housing 46 with a sheet metal sheath 47. This housing has a supply pipe 48 for the heated fine-grained heat carriers, a supply pipe 49 for the fuel to be treated, and an outlet pipe 45 for the mixture of heat carriers and fuel. The heat carriers and the fuel to be treated are preferably introduced into the mixing mechanism one after the other. At the beginning of the mixing mechanism the heated fine-grained heat carriers are introduced through the passage 48 into the mixing mechanism, and the fuel to be treated is continuously introduced through the pipe 49 into the mixing mechanism. The paddles are disposed on the shafts of the mixing mechanism as individual sections 60. It may be advantageous to provide on the mixing shafts, at the beginning of the mixing mechanism for the first conveying of the hot heat carriers, normal worm threads 50 which move the material forwards better than the lenticular bodies and ensure good charging of the material to the mixing mechanism. These normal wormthreads cannot be soiled, since the formation of depositions is possible only after the introduction of the fuel to be treated.

Figure 8:
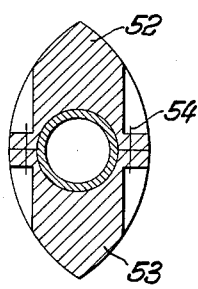

In order to withstand the high temperature stresses which occur in the degasification or gasification of fuels, the shafts of the worms are advantageously water-cooled. The paddles, for example lenticular bodies, can for example be welded on the shafts or be mounted thereon in one or more parts and keyed thereto. It has been found particularly advantageous to construct the continuously spiralled lenticular body of individual parts 52 and 53 in the form of half-bowls, and to secure these half-bowls around the shafts by means of countersunk screws or the like, as illustrated in Figure 8. Individual parts which are exposed to greater wear can thus easily be replaced. Drivers or like devices can also be incorporated which prevent the bowls from slipping on the shaft.

The lenticular bodies can be welded from sheet metal; plain or alloyed cast iron is advantageously used.

If provision is made for cooling the mixing mechanism, it is sufficient in many cases merely to cool the shafts. If required, particularly in the case of worms of larger diameter, the lenticular bodies or like parts of the device may also be connected to the shaft cooling system, or else, if desired, be insulated from the shaft at their point of connection thereto, in order to avoid unnecessary losses of heat.

Figure 9:
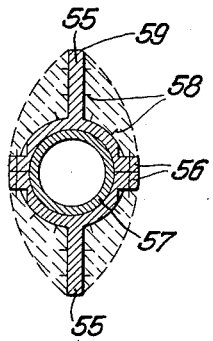

It is not absolutely necessary to make the lenticular shape of solid material. In many cases it is sufficient to mount on the shafts two diametrally opposite blades of straight profiles which extend to the outer diameter of the worm, as indicated in Figure 9. During operation, the lenticular form is then automatically produced by the deposition of coke around the shafts, since all other spaces are covered by the blade edges of the coacting shaft. These blades are preferably mounted helically on the shaft. The use of blades instead of the lenticular shape has the advantage of simpler manufacture and reduced wear, since then only the outer edges are endangered. The deposition of coke on the worm shafts gives a smaller flow of heat to the water-cooled hollow shafts and hence better thermal insulation. The blades 55 are advantageously mounted on half-bowls 56, which are fastened around the shaft 57. The half-bowls 56 and the blades 55 can be provided with fastenings 58, in order to prevent the peeling off the coke deposited around the blades and the shafts.

The outer edges 59 of the lenticular bodies or of the blades are subjected to the greatest wear. It is not absolutely necessary to make the lenticular body or the blades entirely of high-grade and wear-resisting materials. In most cases it is sufficient to make the tips or edges of particularly temperature-resistant and wear-resistant material, which is connected to the lenticular body by welding, screwing, clamping, or the like.

If the degasification of the mixture of fuel and heat carriers in dust or fine-grained form has not yet proceeded sufficiently far, said mixture can be further treated in known manner in the chamber 3; for example, a gaseous medium can be passed through the mixture in such manner that the latter is kept in a fluidised state, for example is in bubbling or boiling movement, and is discharged from the chamber by the gaseous medium on completion of treatment. The procedure may also be to produce a relative movement of heat carriers and fuel; for example, the heat carrier is moved downwards in the chamber 3 to a discharge point and the treated fuel or a part of the same or a part or the whole of its gasification residues is discharged with the gas used and if desired with the gas produced.

The chamber 3 can then, and likewise in other cases, serve solely or mainly as a storage chamber for recycled heat carriers. Depending on requirements, further heat can be supplied to the fuel in the chamber 3, for example by means of additionally introduced heat carriers, or by oxidation processes, or else heat may be withdrawn, for example by endothermic reactions, such as the decomposition of water vapour, carbon dioxide, methane, other gaseous liquid or solid hydrocarbons, or the like, or the reduction of, for example, metals.

In the apparatus illustrated in Figure 2, the thermal treatment of the material coming from the mixing mechanism 24 is further carried out in a vertical, preferably circular shaft. The pneumatic conveying and heating path 22, in which the heat carriers are raised while being simultaneously heated, delivers into a large separator 23, which here has the form of a chamber through which the gases flow at low speed. In the separator 23 the separation of the carriers from the gases is effected. The heat carriers pass through an inlet 25 into the apparatus 24, in which they are intimately mixed with the material to be degasified. Since as a rule all parts of the apparatus are operated at temperatures higher than 400° C. these parts are given a sheet metal jacket with a refractory lining. From the separator 23 the heat carriers pass out through the narrow passage 25 at a temperature of about 400 to 1200° C., for example 950° C., depending on requirements. In the passage 25 there is provided near the mixing apparatus a distributing and regulating means, for example a throttle slide valve 26, which controls the continuous uniform supply of heat carriers into the mixing apparatus. The mixing apparatus 24 is for example constructed in the form of a paddle worm. This consists of a water-cooled shaft on which the individual paddles are welded, for example in the form of round iron bars, flat iron bars, or the like. The flat iron bars can be welded on straight or obliquely, in order to push the material forwards or to restrict its flow therethrough. The material to be degasified is introduced into the mixing apparatus through a pipe 27, while it flows through said pipe 27 by simply falling or by means of blast gas. The blast gas advantageously consists of degasification gas produced in the process itself, which has preferably been cleaned and freed from constitutents which condense at normal temperatures. In the mixing apparatus, the material to be degasified gives up its volatile constituents, while moving continuously and mixing with the heated heat carriers and absorbing heat, and falls downwards, partially degasified, and mixed with the heat carriers at the outlet of the mixing device, through a gravity tube 28 into the degasification chamber 21. In the degasification chamber the mixture forms a filling or closed column of material in which the material to be degasified absorbs further heat from the heat carriers and in which the temperatures of the heat carriers and of the material become practically equal to one another. Instead of the mixing apparatus illustrated in Figure 2, that shown in Figures 3 to 9 can also advantageously be used.

The volatile constituents which are liberated in the mixing apparatus 24 and the degasification chamber 21 flow, for example, through the pipe 29, connected to the uppermost part of the degasification chamber 21, into a cooling, condensation, and cleaning apparatus of known construction. However, the volatile constituents liberated in the mixing apparatus can also be taken off separately, for example through the pipe 30. This is convenient, for example, when it is desired to produce the tar vapours liberated by the first degasification with as little decomposition as possible.

The filling composed of the mixture of heat carriers and degasified material at a temperature of about 400 to 1000° C., for example 900° C., depending on the conditions selected, falls slowly downwards in the degasification chamber 21 and flows through the (advantageously narrow) shaft 31 into the bottom part 32 of the pneumatic conveyor 22. At the outlet of the shaft 31, a regulating means, for example a throttle slide valve 33, is provided, which regulates the amount of heat carriers flowing into the conveyor pipe 22. The cross-section of the bottom part 32 of the pneumatic conveyor pipe is preferably made wider than that of the adjoining conveyor path. The air required for heating and raising the heat carriers, which is for example heated in the preheater 35 to about 200–400° C., is introduced into the part 32 at the bottom through pipe 34. The preheating can, for example, be effected with the hot degasification gas or the hot combustion gases of the conveyor air, or else with any extraneous source of heat. In the part 32 the reaction of the oxygen of the air with the carbon of the degasification residue takes place, while depending on the conditions, i.e. the temperature, the available amount of carbon, and the reaction period, carbon dioxide is produced in varying proportions. The reaction liberates heat, which heats the heat carriers to, for example, 1000° C. The reaction gases convey the heat carriers into the separation chamber 23.

The fire gases flow through the separation chamber at low speed, so that the greatest part of the heat carriers, with the exception of the finest dust only, is precipitated and collects in the bottom part of the chamber 23. The conveyor gases pass out of the top part of the separation chamber 23 and flow through a furnace 36, in which the carbon monoxide and the combustible constituents of the entrained fine dust are burned. The furnace may, for example belong to a steam boiler, a sintering furnace, a gas turbine, or the like, so that the free and bound heat of the combustible substances contained in the conveyor air is profitably utilised.

The heated air carriers pass out of the separation chamber 23 again through the pipe 25 downwards into the mixing apparatus 24. On the separation chamber 23 a pipe 37 with slide valve 40 is provided, from which pipe excess heat carriers, for example coke, if existing, may be continuously or periodically discharged from the circuit. This coke can likewise be passed to the furnace 36 or other utilisation point. If the fuel does not form any excess coke or the like, additional heat carriers, comprising for example sand, coal ash, or the like, are advantageously fed into the circuit.

The levels of the heat carriers in the separation chamber 23 and the degasification chamber are advantageously continuously checked and kept at approximately the same height by controlling the throttle slide valves 26 and 33. The control of the levels can, for example, be effected by measuring with an introduced iron bar or by differential pressure measurement at two points situated one above the other in the filling, in the event of different gas pressures prevailing above and below the filling, or by means of measuring instruments of an electrical nature, or the like.

38 is a grate which is disposed in the bottom part of the degasification chamber, and which on the one hand receives the weight of the filling above the inlet into the narrowed pipe 31, and on the other hand permits the introduction of vapours or gases, for example, water vapour, through the pipe 39. The steam, or for example also carbon dioxide or the like, introduced into the degasification chamber results in the formation of gasification gas on the degasification residue, or also a flushing of the chamber, in order to remove the degasification gas charged with the tar vapours more quickly from the chamber.

The method and the apparatus of the invention are particularly suitable for the production of gas of high calorific value, for example for town gas purposes, or for the subsequent production of gaseous hydrocarbons from the gas, or for the production of tar in conjunction with the generation of power, for which purpose the reaction gases formed with the conveyor air and the fine dust at high temperature are used with particular advantage, or for the production of leaning media in dust form for admixing with coal used in a coke-works, with simultaneous production of tar. Through the simplicity of the construction and the rapid readiness for operation of the hereindescribed apparatus, the method can be used with particular advantage also for the meeting of peak requirements. In order to cover special peaks of gas and power requirements which occur at different times, use can conveniently also be made of the tar produced in addition to adjustment of the operating conditions to comply with the necessary requirements. By returning the tar into the degasification chamber and decomposition of the same, the yield of gas can be increased, or by burning the tar, for example in a steam boiler, the production of power can be increased.

The hereindescribed apparatus can also be operated at higher pressures, for example for the purpose of better utilisation of hot conveyor gases produced under elevated pressure, for example in gas turbines, or for the production of a degasification gas under elevated pressure, which facilitates the cleaning and conveyance of the gas.

In a plant as per Fig. 2 which is equipped with a mixing mechanism as per Fig. 7, 340,000 kg. of coke per hour having a grain size of preferably 0.1 to 2 mm. and a temperature of 1050° C. are conveyed through line 48 into the mixing mechanism; the diameter of the mixing devices 60 amounts to 800 mm. and the effective length of the mixing path to 1200 mm. Through line 49 9000 kg. of bituminous coal per hour with a grain size of preferably 0–3 mm. are introduced into the mixing mechanism. The bituminous coal has substantial caking properties, contains 20% ash and 31% volatile substances and has been dried previously to a water content of 1%. The mixing mechanism moves the hot coke and bituminous coal in parallel current. The mixing elements 60 having a speed of 80 r.p.m. provide for a very turbulent movement, thus bringing about an intimate contact of the material to be mixed. Owing to the great volume of the hot coke with its large surface area a quick and spontaneous heating up of the coal within 1 to 2 seconds is achieved; after temperature assimilation both fuels have a temperature of 1000° C. The degasification of the coal takes place suddenly, whereby part of the coal will burst asunder. The different grains cannot agglomerate, as they are being constantly and intensely mixed with the large mass of glowing coke. At the prevailing high temperature the tar released from the coal is largely decomposed into permanent gases and coke.

The mixture of the circulated coke and the newly formed coke are leaving the mixing mechanism practically with the same grain size as that of the coke which was introduced into the mixing mechanism initially; it flows down into bunker 21 where a final degasification may take place; from here it is delivered to the heating equipment 32 and 22, passes into separator 23 and finally is returned to the mixing device 24. The excess coke is drawn off as a glowing mass at 37 or at 30 and passes e.g. to the fireplace 36, with the gas obtained during the degasification or with gases from the heating equipment.

The gases charged with vapours and produced during the degasification and the tar cracking may also be drawn off with a temperature of 980° C. at the end of the mixing mechanism at point 30 or from bunker 21 at point 29 into a known apparatus, where they are cooled and freed from dust, tar, gas water, naphthalene, benzole, ammonia and hydrogen sulphide.

The following products are obtained from the charged quantity of 9000 kg. of bituminous coal per hour:

2280 kg. of gas
360 kg. of tar
400 kg. of gas water
108 kg. of benzole
6700 kg. of coke The gas has the following composition:

2.4% by vol. of $CO_2$
2.1% by vol. of $C_nH_m$
0.0% by vol. of $O_2$
24.1% by vol. of $CO$
45.9% by vol. of $H_2$
21.9% by vol. of $CH_4$
4.0% by vol. of $N_2$ 100.0% by vol.

The gross calorific value of the gas amounts to 4630 kca.l./m.$^3$. The coke requirements for reheating the circulating coke amount to 15–20% of the newly degasified coke. The gases from the heating equipment and the glowing coke are utilized for the generation of steam in a direct-connected fireplace 36.

What we claim is:

An apparatus for degasifying fuels in finely subdivided solid form, in which such fuels are heated directly with heated finely subdivided heat carriers, comprising a mixing chamber provided with two mixing worms having bodies of lenticular cross-section rotating in the same direction and mutually cleaning one another, said bodies being spiralled forward continuously around the axis of rotation of the worms, means for introducing heated subdivided solid heat carriers to one end of said mixing worms, means for supplying subdivided solid fuel to the mixing worms, a second chamber for degasification and means for discharging the heat carriers and degasification residues from the mixing chamber at the other end of said mixing worms to said second chamber, and means for reheating and recycling the heat carriers to the means for introducing the subdivided solid heat carriers to the mixing worms.

References Cited in the file of this patent

UNITED STATES PATENTS

| | | |
|---|---|---|
| 36,230 | Moller | Aug. 19, 1862 |
| 1,432,101 | Danckwardt | Oct. 17, 1922 |
| 1,530,020 | Tiedke | Mar. 17, 1925 |
| 1,573,824 | Griffiths | Feb. 23, 1926 |
| 1,712,083 | Koppers | May 7, 1929 |
| 1,972,929 | Fisher | Sept. 11, 1934 |
| 2,072,721 | Rahm | Mar. 2, 1937 |
| 2,458,068 | Fuller | Jan. 4, 1949 |
| 2,463,693 | Huff | Mar. 8, 1949 |
| 2,512,076 | Singh | June 20, 1950 |
| 2,517,339 | Offutt et al. | Aug. 1, 1950 |
| 2,567,219 | Lesniak | Sept. 11, 1951 |
| 2,570,864 | Rowlson | Oct. 9, 1951 |
| 2,654,698 | Phinney | Oct. 6, 1953 |
| 2,693,873 | Martin | Nov. 9, 1954 |

FOREIGN PATENTS

| | | |
|---|---|---|
| 672,157 | Great Britain | May 14, 1952 |
| 137,675 | Sweden | Oct. 21, 1952 |
| 480,102 | Italy | Apr. 22, 1953 |